US011272361B2

(12) United States Patent
Stephenson

(10) Patent No.: US 11,272,361 B2
(45) Date of Patent: Mar. 8, 2022

(54) ZERO-TOUCH ONBOARDING IN A NETWORK

(71) Applicant: Ruckus Wireless, Inc., Sunnyvale, CA (US)

(72) Inventor: David Sheldon Stephenson, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 108 days.

(21) Appl. No.: 15/558,550

(22) PCT Filed: Mar. 30, 2015

(86) PCT No.: PCT/US2015/023340
§ 371 (c)(1),
(2) Date: Sep. 14, 2017

(87) PCT Pub. No.: WO2016/159954
PCT Pub. Date: Oct. 6, 2016

(65) Prior Publication Data
US 2018/0063714 A1    Mar. 1, 2018

(51) Int. Cl.
*H04L 29/00* (2006.01)
*H04W 12/06* (2021.01)
(Continued)

(52) U.S. Cl.
CPC .......... *H04W 12/06* (2013.01); *H04L 9/3263* (2013.01); *H04L 63/083* (2013.01);
(Continued)

(58) Field of Classification Search
CPC .... H04W 12/06; H04W 4/50; H04W 12/0023
(Continued)

(56) References Cited

U.S. PATENT DOCUMENTS 7,814,322 B2 * 10/2010 Gurevich ................ H04L 45/20
370/252
8,341,717 B1 * 12/2012 Delker .................... H04L 63/20
705/56

(Continued)

OTHER PUBLICATIONS

International Search Report and Written Opinion for PCT/US2015/023340, dated Oct. 6, 2015.

*Primary Examiner* — Brandon S Hoffman
*Assistant Examiner* — Michael D Anderson
(74) *Attorney, Agent, or Firm* — Steven Stupp; Stewart Wiener

(57) ABSTRACT

A technique for establishing connectivity between electronic devices is described. In particular, when an electronic device is first connected to a network, the electronic device may use a predefined location of a registrar device to request location information for a controller for the electronic device. The electronic device may provide a manufacturer certificate to the registrar device to confirm its identity. After receiving from the registrar device the location information and a registrar certificate that confirms its identity, the electronic device may use the location information to request the security information from a controller that allows the electronic device to establish connectivity with another electronic device. The electronic device may receive the security from the controller along with a controller certificate that confirms the identity of the controller. Moreover, the electronic device may establish a connection with the other electronic device based on the security information.

20 Claims, 5 Drawing Sheets

(51) Int. Cl.
*H04W 4/50* (2018.01)
*H04W 8/00* (2009.01)
*H04W 12/04* (2021.01)
*H04W 12/30* (2021.01)
*H04L 9/32* (2006.01)
*H04L 29/06* (2006.01)
*H04W 84/12* (2009.01)
*H04W 76/10* (2018.01)
*H04W 84/18* (2009.01)

(52) U.S. Cl.
CPC ........... *H04L 63/0823* (2013.01); *H04W 4/50* (2018.02); *H04W 8/005* (2013.01); *H04W 12/04* (2013.01); *H04W 12/35* (2021.01); *H04L 2209/80* (2013.01); *H04W 76/10* (2018.02); *H04W 84/12* (2013.01); *H04W 84/18* (2013.01)

(58) Field of Classification Search
USPC .......................................................... 726/10
See application file for complete search history.

(56) References Cited

U.S. PATENT DOCUMENTS

| | | | |
|---|---|---|---|
| 9,143,400 B1 | 9/2015 | Roskind | 709/217 |
| 9,226,146 B2 | 12/2015 | Ranade | 726/6 |
| 2008/0002700 A1 | 1/2008 | Chandrapal | 370/392 |
| 2008/0232382 A1 | 12/2008 | Iwama | 370/401 |
| 2010/0131762 A1 | 5/2010 | Wu | 713/170 |
| 2010/0182984 A1 | 7/2010 | Herscovici | 370/338 |
| 2010/0269153 A1 | 10/2010 | Kato | 726/3 |
| 2010/0313262 A1 | 12/2010 | Mehta | 726/12 |
| 2011/0235627 A1* | 9/2011 | Wang | H04L 67/306 370/338 |
| 2012/0030466 A1 | 2/2012 | Yamaguchi | 713/168 |
| 2013/0203378 A1 | 8/2013 | Vos | 455/406 |
| 2014/0068736 A1 | 3/2014 | Agerstam | 726/7 |
| 2014/0075025 A1 | 3/2014 | Stanforth | 709/225 |
| 2014/0086177 A1 | 3/2014 | Adjakple et al. | 370/329 |
| 2014/0206346 A1 | 7/2014 | Kiukkonen | 455/426.1 |
| 2014/0235171 A1 | 8/2014 | Andrew | 455/41.2 |
| 2014/0334406 A1 | 11/2014 | Chen | 370/329 |
| 2016/0021066 A1 | 1/2016 | Parvathaneni | H04L 63/0428 |

* cited by examiner

ZERO-TOUCH ONBOARDING IN A NETWORK

CROSS REFERENCE TO RELATED APPLICATIONS

This application claims priority under 35 U.S.C. § 371 to International Patent Application No. PCT/US15/23340, "Zero-Touch Onboarding in a Mesh Network," by David Sheldon Stephenson, filed on Mar. 30, 2015, the contents of which are herein incorporated by reference.

BACKGROUND

Field

The described embodiments relate to techniques for establishing communication between electronic devices. In particular, the described embodiments relate to techniques for determining the location of a controller in a network and receiving security information to establish connectivity between electronic devices.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

One approach to wireless communication is to use a wireless mesh network (which is henceforth referred to as a 'mesh network'). In a mesh network, multiple electronic devices (which are sometimes referred to as 'nodes') are organized in a mesh topology in which electronic devices wirelessly communicate with each other or to the Internet via zero or more intermediate electronic devices or nodes.

However, it can be difficult to establish a mesh network. In particular, in order for electronic devices to establish a mesh network they typically need to have mesh-network information, such as a mesh-network identifier (such as a mesh-network service set identifier or a mesh-network SSID) and credentials for the mesh network (such as a mesh-network encryption key and/or a mesh-network password). Usually, the mesh-network information is manually installed by an operator on the electronic device before it joins the mesh network. Moreover, the manual installation typically involves the operator establishing a wired connection between the electronic device and the controller. Consequently, this manual approach to provisioning or priming the electronic device is often cumbersome and time-consuming.

SUMMARY

The described embodiments relate to an electronic device that receives security information. This electronic device includes an antenna and an interface circuit, coupled to the antenna, that communicates with other electronic devices. During operation, the electronic device discovers, via wireless communication, the other electronic device. Then, the electronic device provides, to a registrar device at a pre-defined location in a network, a request for location information of a controller for the electronic device, where the request includes a manufacturer certificate that confirms an identity of the electronic device, and the communication with the registrar device may occur via the other electronic device using the wireless communication without an authenticated session between the electronic device and the other electronic device. Moreover, the electronic device receives, from the registrar device, the location information and a registrar certificate that confirms an identity of the registrar device, and the electronic device validates the registrar certificate. Furthermore, the electronic device provides, to the controller via the other electronic device, a request for security information to establish connectivity with another electronic device. Next, the electronic device receives, from the controller via the other electronic device, the security information and a controller certificate that confirms an identity of the controller, and the electronic device validates the controller certificate.

Additionally, the electronic device may establish a connection with the other electronic device based on the security information. The security information may facilitate secure communication between the electronic device and the other electronic device.

Note that the electronic device may exclude the security information prior to requesting the security information. Moreover, note that the electronic device may be a headless electronic device without a user interface.

In some embodiments, the electronic device provides the request for the location information a first time that the electronic device is connected to the network.

Moreover, the security information may include provisioning information for a mesh network. For example, the provisioning information may include a mesh-network service set identifier (SSID), a mesh-network encryption key and/or a mesh-network password.

Furthermore, the electronic device may establish the mesh network with a third electronic device by: broadcasting the mesh-network SSID; receiving, from the third electronic device, the manufacturer certificate; validating the manufacturer certificate received from the third electronic device; and providing, to the third electronic device, the provisioning information.

Note that the wireless communication may be compatible with IEEE 802.11 public action frames (such as a generic advertising service in an IEEE802.11u communication protocol). Thus, the communication with the other electronic device and the registrar device may occur without the electronic device having an Internet Protocol (IP) address.

In some embodiments, prior to providing the request for the security information, the electronic device receives, from the other electronic device, the mesh-network information for the mesh network that includes the other electronic device, where the mesh-network information includes the mesh-network SSID, the mesh-network encryption key and/or the mesh-network password. Then, the electronic device joins the mesh network using the mesh-network information, where the security information includes additional provisioning information for the mesh network.

Note that the other electronic device may be an access point in the mesh network.

Additionally, after discovering the other electronic device, the electronic device may: request an encryption key and a manufacturer certificate of the other electronic device; and validate the manufacturer certificate of the other electronic device. Subsequent wireless communication from the electronic device to the other electronic device may be encrypted using the encryption key of the other electronic device. Similarly, after discovering the other electronic device, the electronic device may provide an encryption key of the electronic device to the other electronic device, and subsequent wireless communication from the other electronic device to the electronic device may be encrypted using the encryption key of the electronic device.

In some embodiments, the electronic device includes: a processor; and a memory, coupled to the processor, which stores a program module that is executed by the processor. This program module may include instructions for at least some of the operations performed by the electronic device (i.e., at least some of the operations performed by the electronic device may be performed using software).

Another embodiment provides a computer-program product for use with the electronic device. This computer-program product includes instructions for at least some of the operations performed by the electronic device.

Another embodiment provides a method. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A technique for establishing connectivity between electronic devices is described. In particular, when an electronic device is first connected to a network, the electronic device may use a predefined location of a registrar device to request location information for a controller for the electronic device. The electronic device may provide a manufacturer certificate to the registrar device to confirm its identity. After receiving from the registrar device the location information and a registrar certificate that confirms its identity, the electronic device may use the location information to request the security information from a controller that allows the electronic device to establish connectivity with another electronic device. The electronic device may receive the security from the controller along with a controller certificate that confirms the identity of the controller. Moreover, the electronic device may establish a connection with the other electronic device based on the security information.

By allowing the electronic device to establish the connection with the other electronic device, this communication technique may facilitate automated onboarding of electronic devices in a network (such as a mesh network) without requiring that these electronic devices be primed, in advance, with the necessary provisioning information. For example, using the communication technique it may not be necessary for operators to manually install the provisioning information on the electronic devices and/or to establish a wired connection between the electronic device and the controller. Consequently, the communication technique may be less cumbersome and time-consuming than existing approaches for provisioning electronic devices, and may facilitate self-service and auto-provisioning.

In the discussion that follows, the electronic devices include interface circuits and/or radios that communicate frames that include payloads (e.g., packets) in accordance with a communication protocol, such as: an Institute of Electrical and Electronics Engineers (IEEE) 802.11 standard (which is sometimes referred to as 'Wi-Fi®,' from the Wi-Fi Alliance of Austin, Tex.), Bluetooth (from the Bluetooth Special Interest Group of Kirkland, Wash.), another type of wireless interface (such as another wireless-local-area-network interface), an Institute of Electrical and Electronics Engineers (IEEE) 802.3 standard (which is sometimes referred to 'Ethernet'), and/or another type of wired interface. In the discussion that follows, Wi-Fi and Ethernet are used as illustrative examples. However, a wide variety of communication protocols may be used.

Figure 1:
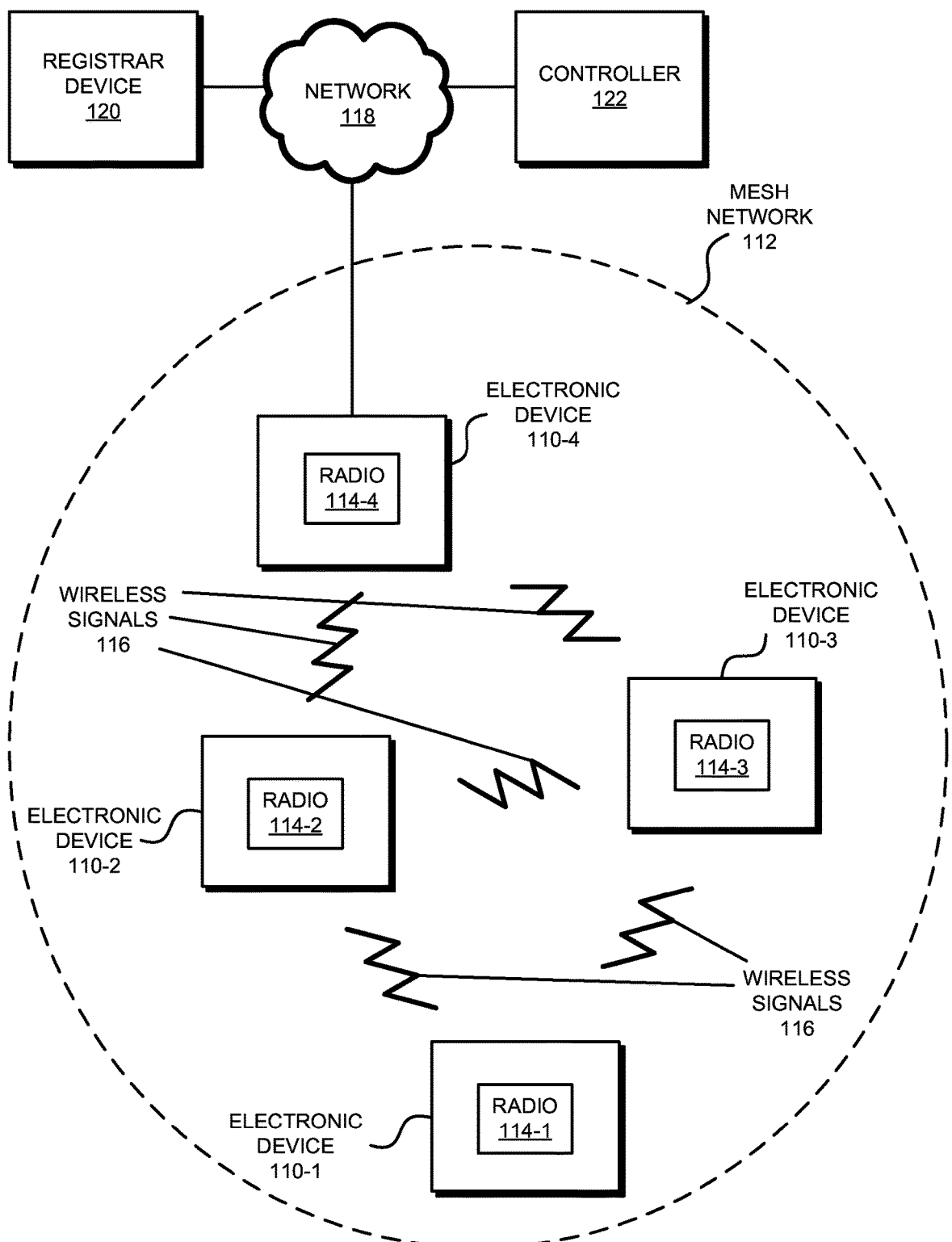
FIG. 1 is a block diagram illustrating electronic devices communicating in accordance with an embodiment of the present disclosure.

Communication among electronic devices is shown in FIG. 1, which presents a block diagram illustrating electronic devices 110 (such as access points) wirelessly communicating in a mesh network 112 according to some embodiments. In particular, these electronic devices may wirelessly communicate while: transmitting advertising frames on wireless channels, detecting one another by scanning wireless channels, establishing connections (for example, by transmitting association requests), and/or transmitting and receiving frames that include packets (which may include the association requests and/or additional information as payloads). Note that a 'mesh network' may have a network topology in which each electronic device or node (which is sometimes called a 'mesh electronic device') relays data for the mesh network, and the nodes cooperate in the distribution of data in the mesh network. Moreover, in a 'mesh network,' a path to a root device, which is coupled to a wired network 118 (such as the Internet and/or an intranet), contains at least one wireless connection that passes information from a client device in mesh network 112 to network 118. In some embodiments, the mesh network includes an electronic device (which is sometimes called an 'Ethernet mesh electronic device') that communicates with another electronic device in the mesh network using Ethernet.

As described further below with reference to FIG. 5, electronic devices 110 may include subsystems, such as a networking subsystem, a memory subsystem and a processor subsystem. In addition, electronic devices 110 may include radios 114 in the networking subsystems. More generally, electronic devices 110 can include (or can be included within) any electronic devices with the networking subsystems that enable electronic devices 110 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security, Wi-Fi Protected Access, etc.), transmit and receive frames that include packets via the connection, etc.

Moreover, as can be seen in FIG. 1, wireless signals 116 (represented by jagged lines) are transmitted by radios 114 in electronic devices 110. For example, radio 114-1 in electronic device 110-1 may transmit information (such as frames that include packets) using wireless signals. These wireless signals are received by radios 114 in one or more other electronic devices (such as electronic devices 110-2 and 110-3). This may allow electronic device 110-1 to communicate information to electronic devices 110-2 and/or 110-3. Furthermore, electronic devices 110-2 and/or 110-3 may wirelessly transmit frames that include packets to electronic device 110-4, which is a root device in mesh network 112. This root device has a direct connection to a wired network, such as network 118. Note that electronic device 110-1 may access network 118 via at least one of electronic devices 110-2 and 110-3, and electronic device 110-4. Thus, electronic device 110-1 may access network 118 via one intermediary (such as via electronic device 110-2 or electronic device 110-3, which then communicates with electronic device 110-4) or two intermediaries (such as via electronic device 110-2, which communicates with electronic device 110-3, which in turn communicates with electronic device 110-4) in mesh network 112. In FIG. 1, while electronic devices 110-2 and 110-3 have the 'option' to communicate with each other (because they are within communication or wireless range of each other) in a typical IEEE 802.11 network, the network design may involve operating elements that prevent a network loop condition. Thus, while it is ok to 'connect', from the perspective of network packet forwarding, FIG. 1 should not be construed as to imply that a network loop condition exists, if this condition is detrimental to the network.

Note that the communication among electronic devices 110 (such as between at least any two of electronic devices 110) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication among electronic devices 110 (such as between at least any two of electronic devices 110) is characterized by an error-rate model, which compares the error rate during communication at the data rate. Note that the hierarchy (or tree) of electronic devices 110 in mesh network 112 may dynamically change based on one or more of the performance metrics (such as based on changes in a radio-frequency environment).

As noted previously, the communication technique may allow electronic devices 110 to be aggregated into mesh network 112 in an automated manner and without priming electronic devices 110 with or pre-installing provisioning information for mesh network 112 (which is sometimes referred to as 'security information' or 'mesh-network information'). Instead, when electronic device 110-4 (i.e., the root device in mesh network 112) is first connected to or coupled to network 118, registrar device 120 and controller 122 may provision electronic device 110-4 so that electronic device 110-4 can establish mesh network 112. In order to ensure security, the information exchanged during the communication technique may be authenticated so that the identities of electronic device 110-4, registrar device 120 and controller 122 are confirmed and, thus, to establish trust among the components in the communication technique. This may prevent unauthorized third parties from hijacking or taking over one or more of the electronic devices in FIG. 1.

In particular, during the communication technique electronic device 110-4 may provide to registrar device 120, at a predefined location in network 118 (which may be stored in electronic device 110-4), a request for location information of controller 122 for electronic device 110-4. This request may include a manufacturer certificate (such as a Public Key Infrastructure or PKI certificate from a manufacturer of electronic devices 110, which may be unique or specific to electronic device 110-4) that confirms an identity of electronic device 110-4. For example, registrar device 120 may validate the manufacturer certificate to confirm the identity of electronic device 110-4, such as by using a public encryption key of the manufacturer. Note that the manufacturer certificate may also include a digital signature.

If the manufacturer certificate is valid, registrar device 120 may access stored information identifying the controller for electronic device 110-4 as controller 122, as well as the location information of controller 122 (such as an Internet Protocol or IP address or a fully qualified domain name). For example, registrar device 120 may look up the location information based on a serial number or a numerical identifier of electronic device 110-4. Then, registrar device 120 may provide to electronic device 110-4, using network 118, the location information and a registrar certificate. In response, electronic device 110-4 may validate the registrar certificate to confirm an identity of registrar device 120.

Using the location information, electronic device 110-4 may provide to controller 122, using network 118, a request for security information to establish connectivity with another electronic device, such as another one of electronic devices 110. For example, the location information may include the IP address of controller 122, and electronic device 110-4 may provide the request directly using the IP address. Alternatively, the location information may include a fully qualified domain name of controller 122, and electronic device 110-4 may receive the IP address from a Domain Name System before providing the request to controller 122. Note that in some embodiments electronic device 110-4 provides, with the request, the manufacturer certificate to controller 122 to confirm the identity of electronic device 110-4.

Controller 122 may store the security information, such as provisioning information for mesh network 112 (at least some of which is sometimes referred to as 'mesh-network information'). For example, the provisioning information may include: a mesh-network service set identifier (SSID), a mesh-network encryption key (such as a symmetric or an asymmetric encryption key, a hashing function, a derived encryption key, etc.) and/or a mesh-network password (or a credential or a shared secret, such as a random or a pseudorandom number). (More generally, the security information may include an identifier and an encryption key that facilitate establishing secure connections among electronic devices 110.) Therefore, in response to the request, controller 122 may look up and then may provide (via network 118) the security information. In addition, controller 122 may provide a controller certificate that confirms an identity of controller 122. In response, electronic device 110-4 may validate the controller certificate. Note that electronic device 110-4 may exclude the security information prior to requesting the security information (i.e., electronic device 110-4 may not be primed or pre-provisioned with the security information). Instead, the communication technique may be used to provision electronic device 110-4. Moreover, note that electronic device 110-4 may be a headless electronic device without a user interface (such as an access point), so that, without the communication technique, a user or an operator of electronic device 110-4 may not be able to readily provision electronic device 110-4.

Next, electronic device 110-4 may establish a connection with another electronic device (such as electronic device 110-2) based on the security information. For example, electronic device 110-4 may establish mesh network 112 with electronic device 110-2 by: broadcasting (using radio 114-4) the mesh-network SSID; receiving, from electronic device 110-2, the manufacturer certificate; validating the manufacturer certificate received from electronic device 110-2; and providing, electronic device 110-2, additional provisioning information. Thus, in some embodiments electronic device 110-4 is preconfigured to identify and allow electronic device 110-2 to join mesh network 112. For example, electronic device 110-4 may include information such as manufacturer certificates of other electronic devices that are allowed to join mesh network 112. Alternatively, electronic device 110-4 may not be preconfigured in this way. In these embodiments, electronic device 110-4 relays the manufacturer certificate received from electronic device 110-2 to controller 122 and, after receiving the additional provisioning information from controller 122, provides it to electronic device 110-2.

Subsequently, another electronic device (such as electronic device 110-3) may discover, via wireless communication, electronic device 110-4, and communication between electronic device 110-3 and registrar device 120 may occur via electronic device 110-4 using the wireless communication without an authenticated session (or a layer-2 security association) between electronic devices 110-3 and 110-4. Note that the wireless communication may be compatible with IEEE 802.11 public action frames (such as a generic advertising service in an IEEE802.11u communication protocol). Furthermore, note that public action frames are a subtype of an IEEE 802.11 management frame. Alternatively, the wireless communication may use a protocol that is carried in IEEE 802.11 frames of type data while electronic device 110-3 is associated to electronic device 110-4 but not Robust Security Network (RSN) authenticated. Note that this is referred to as State 3 in the IEEE 802.11 association state machine (as described in FIG. 10-6 in IEEE Standard 802.11-2012, entitled "Standard for Information technology—Telecommunications and information exchange between systems Local and metropolitan area networks—Specific requirements Part 11: Wireless LAN Medium Access Control (MAC) and Physical Layer (PHY) Specifications"). Typically, this is accomplished using an Ethertype that is recognized by an access point for communication of information prior to authentication. Additionally, note that this technique is used for IEEE 802.11 RSN authentication using Extensible Authentication Protocol, which is exchanged between a client device and an access point using Extensible Authentication Protocol over LAN (EAPOL) frames. Thus, the communication with electronic device 110-4 and registrar device 120 may occur without electronic device 110-3 having an IP address.

By accessing network 118 via wireless communication with electronic device 110-4, electronic device 110-3 may provide to registrar device 120, at the predefined location in network 118 (which may be stored in electronic device 110-3), a request for location information of controller 122 for electronic device 110-3. This request may include the manufacturer certificate that confirms an identity of electronic device 110-3. (Note that this manufacturer certificate may be unique or specific to electronic device 110-3). If the manufacturer certificate is valid, registrar device 120 may access stored information identifying the controller for electronic device 110-3 as controller 122, as well as the location information of controller 122. Then, registrar device 120 may provide to electronic device 110-3, using network 118 and wireless communication between electronic devices 110-3 and 110-4, the location information and the registrar certificate.

After validating the registrar certificate to confirm an identity of registrar device 120, electronic device 110-3 may provide to controller 122, using wireless communication with electronic device 110-4 and via network 118, a request for the security information to establish connectivity with electronic device 110-4. In response, controller 122 may provide to electronic device 110-3, via network 118 and using wireless communication between electronic devices 110-3 and 110-4, the security information (such as the provisioning information, e.g., the mesh-network SSID, the mesh-network encryption key and/or the mesh-network passphrase), as well as the controller certificate that confirms an identity of controller 122. Moreover, after confirming the controller certificate, electronic device 110-3 may provide, via wireless communication, the mesh-network information (such as the mesh-network SSID, the mesh-network encryption key and/or the mesh-network passphrase) to electronic device 110-4 to join mesh network 112 (after this operation, an authenticated session may exist). For example, electronic devices 110-3 and 110-4 may use mesh-network SSID and the mesh-network password to authenticate each other (such as using a Pre-Shared Key or WPA-Personal), and then electronic devices 110-3 and 110-4 may subsequently encrypt their communication in mesh network 112. (In some embodiments, the mesh-network encryption key is not provided directly from electronic device 110-3 to electronic device 110-4. Instead, a so-called four-way handshake, defined in an IEEE 802.11 communication protocol, setups encryption based on the PSK/passphrase, such as WPA2-Personal.) More generally, electronic device 110-4 may establish secure communication with electronic device 110-2 based on or using the security information. While mesh network 112 is used as an illustration in FIG. 1, the security information may implement a wide variety of security or encryption techniques, such as: Wi-Fi Protected Access-Personal (WPA-Personal), WPA2-Enterprise (with a username and a password), an embedded universal integrated circuit card or eSIM, etc. Consequently, the security information may include an identity or identifier for a given electronic device and/or a passphrase or password. After joining mesh network 112, electronic device 110-4 may provide to electronic device 110-3, via wireless communication, additional provisioning information for mesh network 112.

Alternatively, in some embodiments prior to requesting the security information from controller 122, electronic devices 110-3 and 110-4 may exchange and validate the manufacturer certificate or may confirm each other's identities because they are configured to support a proprietary exchange of the mesh-network information (which may only be supported by access points from the same manufacturer). Then, electronic device 110-3 may receive from electronic device 110-4, via wireless communication, the mesh-network information for mesh network 112 (such as the mesh-network SSID, the mesh-network encryption key and/or the mesh-network password). Electronic device 110-3 may use the mesh-network information to join mesh network 112. Furthermore, electronic device 110-3 may then request the security information from controller 122, such as additional provisioning information for mesh network 112.

Note that electronic device 110-3 may receive zone information in mesh network 112 from electronic device 110-4 and/or controller 122. For example, there may be different customers or tenants using mesh networks other than in mesh network 112, within radio range of electronic device 110-3 with different configurations and/or services. The zone information may specify the configuration and/or the service for a particular user or customer. If electronic device 110-3 belongs to a different zone than electronic device 110-4, electronic device 110-4 will not relay configuration information from controller 122. Instead, controller 122 may provide to electronic device 110-3, via relay by electronic device 110-4, a status code indicating electronic device 110-3 does not belong to this zone. In this case, electronic device 110-3 may attempt to discover a different mesh network (i.e., a mesh network having a different mesh network SSID) and repeat the procedures described herein. Once the desired network is discovered, electronic device 110-3 may join that mesh network.

In the described embodiments, processing a frame that includes packets in electronic devices 110 includes: receiving the wireless signals with the frame; decoding/extracting the frame from the received wireless signals to acquire the frame; and processing the frame to determine information contained in the payload of the frame (such as the packet, which may include feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

Figure 2:
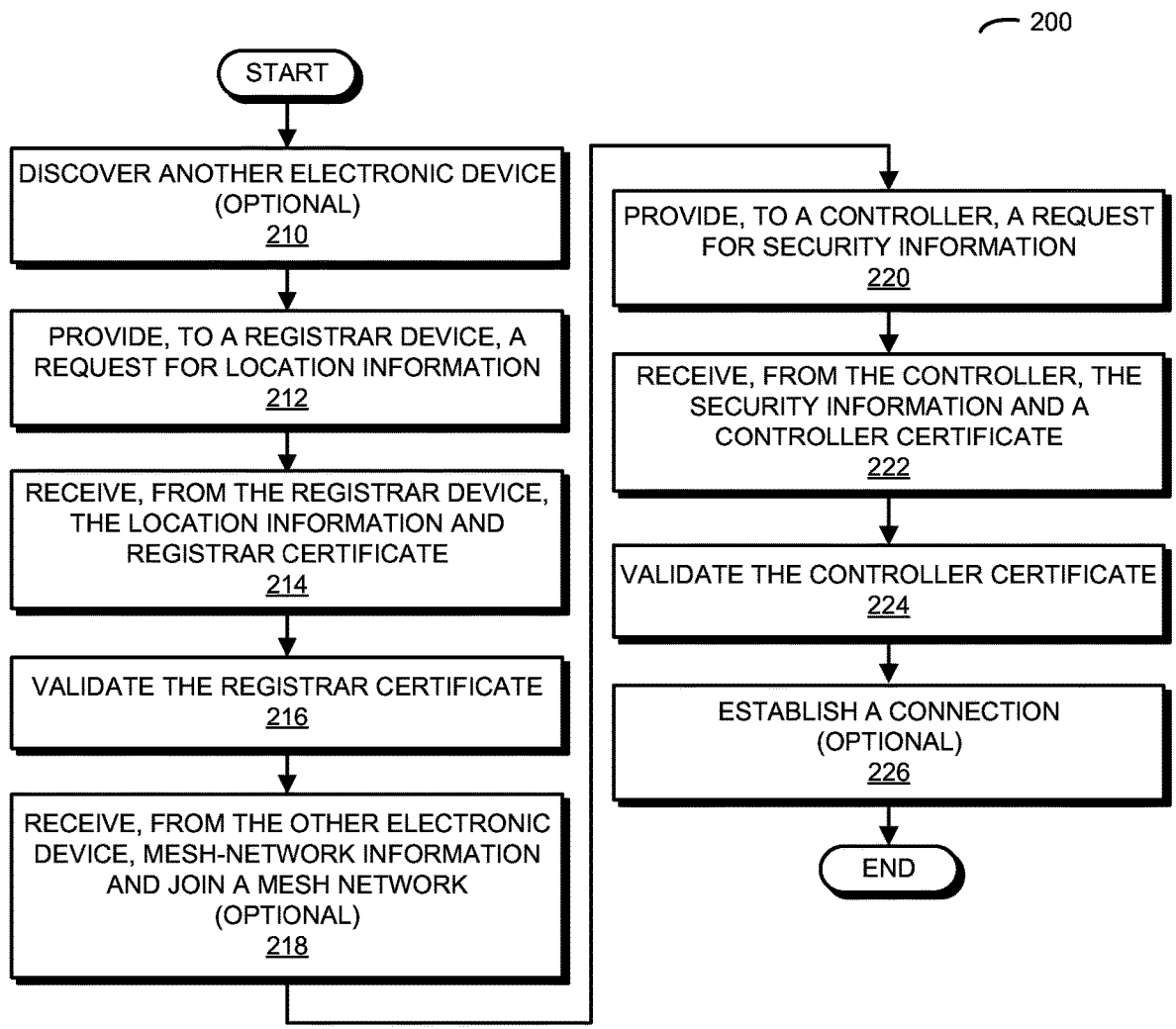
FIG. 2 is a flow diagram illustrating a method for receiving security information from one or more of the electronic devices in FIG. 1 in accordance with an embodiment of the present disclosure.

FIG. 2 presents embodiments of a flow diagram illustrating method 200 for receiving security information that may be performed by an electronic device, such as one of electronic devices 110 in FIG. 1 (e.g., electronic device 110-1), according to some embodiments. During operation, the electronic device discovers, via wireless communication, another electronic device (operation 210). Then, the electronic device provides, to a registrar device at a predefined location in a network, a request for location information of a controller (operation 212) for the electronic device, where the request includes a manufacturer certificate that confirms an identity of the electronic device, and communication with the registrar device may occur via the other electronic device using the wireless communication without an authenticated session between the electronic device and the other electronic device. For example, the electronic device may provide the request for the location information a first time that the electronic device is connected to the network. Note that the wireless communication may be compatible with IEEE 802.11 public action frames (such as a generic advertising service in an IEEE802.11u communication protocol). Thus, the communication with the other electronic device and the registrar device may occur without the electronic device having an IP address.

Then, the electronic device receives, from the registrar device, the location information and a registrar certificate (operation 214) that confirms an identity of the registrar device, and the electronic device validates the registrar certificate (operation 216).

Moreover, the electronic device provides, to the controller via the other electronic device, a request for security information (operation 220) to establish connectivity with the other electronic device (and, in particular, secure communication with the other electronic device). Next, the electronic device receives, from the controller via the other electronic device, the security information and a controller certificate (operation 222) that confirms an identity of the controller, and the electronic device validates the controller certificate (operation 224). Note that the security information may include provisioning information for a mesh network. For example, the provisioning information may include: a mesh-network service set identifier (SSID), a mesh-network encryption key and/or a mesh-network password.

Furthermore, the electronic device may optionally establish a connection (operation 226) with a third electronic device based on the security information. For example, the electronic device may establish the mesh network with the third electronic device by: broadcasting the mesh-network SSID; receiving, from the third electronic device, the manufacturer certificate; validating the manufacturer certificate received from the third electronic device; and providing, to the third electronic device, the provisioning information. Note that the third electronic device may perform some or all of the preceding operation to receive the location information from the registrar device and/or the security information from the controller.

Moreover, prior to providing the request for the security information (operation 220), the electronic device may optionally receive, from the other electronic device, the mesh-network information (operation 218) for the mesh network that includes the other electronic device, where the mesh-network information includes the mesh-network SSID, the mesh-network encryption key and/or the mesh-network password. Then, the electronic device may optionally join the mesh network (operation 218) using the mesh-network information, where the security information includes additional provisioning information for the mesh network. Note that after this operation, an authenticated session may exist between the electronic device and the other electronic device.

In this way, the electronic device (for example, an interface circuit, a driver and/or software executed in an environment of the electronic device) may facilitate communication with one or more other electronic devices in the mesh network. In particular, the electronic device may authenticate and may be provisioned so that the electronic device can establish or join the mesh network in an automated manner. This capability may make provisioning the electronic device less cumbersome and time-consuming, thereby reducing the cost, complexity and/or expense associated with setting up the mesh network.

In some embodiments of method 200, there may be additional or fewer operations. For example, the request for the security information (operation 220) may be combined with or included in the request for the location information (operation 212). Alternatively, the request for the security information may be handled for the electronic device by the other electronic device without an explicit request from the electronic device. In these embodiments, the other electronic requests the security information from the controller for the electronic device based on the information received from the registrar device, such as information indicating that the electronic device is to be included in the same mesh network as the other electronic device and/or that the electronic device is included in the same zone as the other electronic device. Moreover, note that the other electronic device may validate the registrar certificate and/or may validate the controller certificate on behalf of the electronic device.

Furthermore, after discovering the other electronic device (operation 210), the electronic device may: request an encryption key (such as a public encryption key) and a manufacturer certificate of the other electronic device (or the other electronic device may provide the encryption key and the manufacturer certificate of the other electronic device without a request from the electronic device); and validate the manufacturer certificate of the other electronic device. Subsequent wireless communication from the electronic device to the other electronic device may be encrypted using the encryption key of the other electronic device. Similarly, after discovering the other electronic device (operation 210), the electronic device may provide an encryption key of the electronic device (such as a public encryption key) to the other electronic device, and subsequent wireless communication from the other electronic device to the electronic device may be encrypted using the encryption key of the electronic device. Thus, after discovery, the wireless communication between electronic device and the other electronic device may be encrypted.

Additionally, the order of the operations may be changed, and/or two or more operations may be combined into a single operation.

Figure 3:
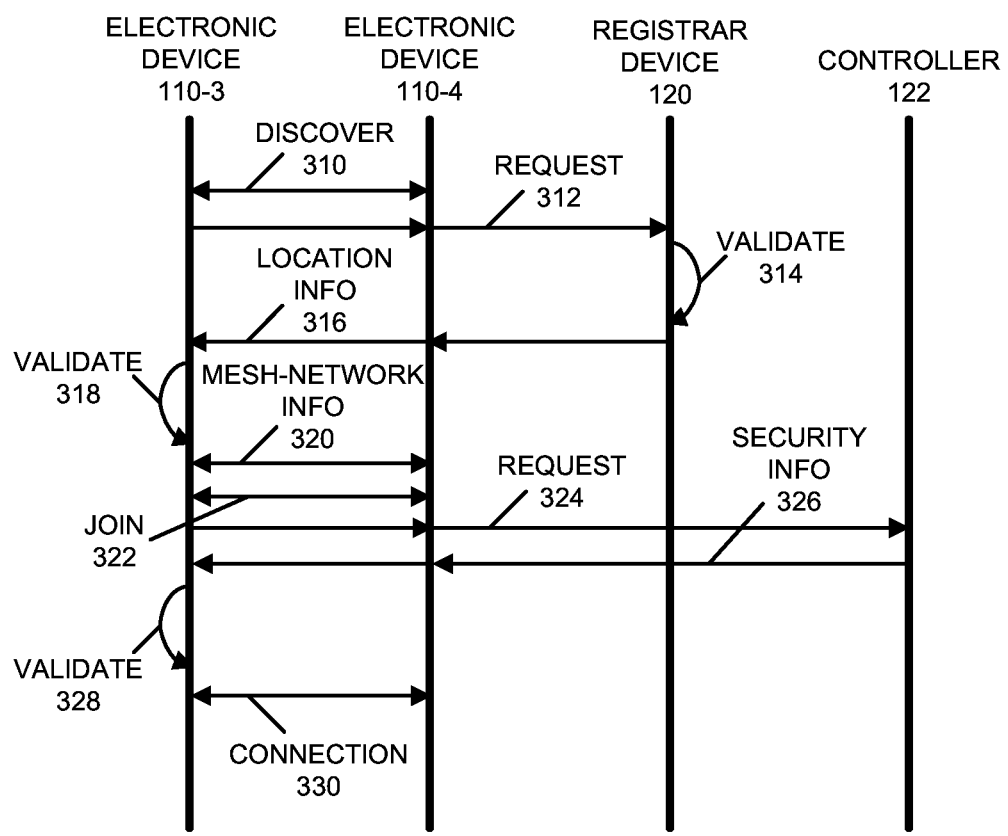
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication between electronic device 110-3, electronic device 110-4, registrar device 120 and controller 122 according to some embodiments. In particular, during the communication technique electronic device 110-3 may optionally discover 310 electronic device 110-4 via wireless communication. When this occurs, subsequent communication with registrar device 120 may occur via wireless communication with electronic device 110-4 (e.g., using a generic advertising service in an IEEE 802.11u communication protocol and, more generally, using public action frames).

Then, electronic device 110-3 may provide, via electronic device 110-4 and the network, a request 312 for location information to registrar device 120 at a predefined location in a network (such as an IP address of registrar device 120). This request may include a manufacturer certificate of electronic device 110-3. Note that request 312 may be provided a first time that electronic device 110-3 is connected to the network.

Registrar device 120 may validate 314 the manufacturer certificate. Then, registrar device 120 may look up and provide to the electronic device 110-3 (either directly via the network or via the network and electronic device 110-4) location information 316, as well as a registrar certificate that confirms an identity of registrar device 120. For example, registrar device 120 may provide the fully qualified domain name of controller 122, as well as the public encryption key of controller 122, an optional zone name, and a digital signature for at least a part of the registrar certificate (to detect tampering). In response to the information received from registrar device 120, electronic device 110-3 validates 318 the registrar certificate.

In some embodiments, electronic device 110-3 optionally receives from electronic device 110-4 mesh-network information 320 for the mesh network that includes electronic device 110-4, where the mesh-network information includes the mesh-network SSID, the mesh-network encryption key and/or the mesh-network password. Then, electronic device 110-3 may optionally join 322 the mesh network using the mesh-network information.

Next, electronic device 110-3 provides, via electronic device 110-4 and the network, a request 324 for security information to controller 122 to establish connectivity with electronic device 110-4. In response, controller 122 provides, via the network and electronic device 110-4, security information 326, as well as a controller certificate that confirms an identity of controller 122. In response, electronic device 110-3 validates 328 the controller certificate. Note that security information 326 may include provisioning information for a mesh network. For example, the provisioning information may include: a mesh-network service set identifier (SSID), a mesh-network encryption key and/or a mesh-network password.

Furthermore, electronic device 110-3 may optionally establish a connection 330 with electronic device 110-4 based on security information 326. For example, electronic device 110-3 may establish the mesh network with electronic device 110-4 by: broadcasting the mesh-network SSID; receiving, from electronic device 110-4, the manufacturer certificate; validating the manufacturer certificate received from electronic device 110-4; and providing, to the other electronic device, the provisioning information.

In an exemplary embodiment, each node (or electronic device) in a wireless mesh network may be automatically provisioned by a registrar device and a controller so that the nodes possess mesh-network information (such as a mesh-network encryption key or a mesh-network key, e.g., a PSK) in order to authenticate and form a secure wireless connection with another wireless node. This capability may allow these nodes to form a wireless mesh network that acts as a network backbone and that provides service to an intranet and/or the Internet.

Existing access points in a mesh network (which are sometimes referred to as 'mesh-network access points' or 'mesh access points') that do not have a wired connection typically cannot auto-discover their serving controller because they do not know the identity of their controller, where this controller is located or the credentials for their controller. Furthermore, mesh-network access points do not know the mesh network (or mesh SSID) they should join. Even if there was a communication link and the mesh network were known, a mesh-network access point usually cannot join the mesh network because it does not possess the mesh-network PSK passphrase (or the mesh-network password). To address these problems, many mesh-network access points are 'primed' prior to deployment. This means that they are first manually connected (via a wired connection) to a physical or a virtual controller, they receive their provisioning parameters (including the mesh-network SSID and the mesh-network PSK passphrase) and then are installed at their desired location. Once installed, a given mesh-network access point may perform wireless-network discovery, and then may associate to or with another access point (such as a root access point, a mesh access point or an Ethernet mesh-network access point) beaconing their provisioned mesh-network SSID. However, this manual procedure often provides a poor user experience.

The embodiments of the communication technique may facilitate auto-provisioning of the mesh-network access points. This approach may allow access points to auto-connect to a mesh network without priming (which is sometimes referred to as zero-touch onboarding of mesh-network access points). In particular, a data structure in a registrar device may store information specifying mesh-network membership of access points (such as the associated controller, the fully qualified domain name of the controller and the public encryption key of the associated controller, which is included in the controller certificate of the controller). Note that the information in this data structure may be provided, via an application programming interface, by: an operator of the registrar device, a distributor of a given access point and/or a customer. In some embodiments, the data structure in the registrar device includes: an access-point identifier (such as a serial number of an access point), and a fully qualified domain name or an IP address of an associated controller of the access point.

As a factory default, when an access point is plugged in, the mesh network may be automatically setup. For example, a root access point (which is sometimes referred to as a 'root device') in the mesh network (which has a wired connection to a network, such as the Internet) may discover its controller via the registrar device. Then, this root access point may be provisioned by the controller with the mesh-network information (such as the mesh-network SSID). Note that the controller may or may not be implemented in the cloud.

Another access point (which has a wireless connection with the root access point) may discover and communicate with the root access point using a generic advertising services in an IEEE 802.11u communication protocol (and, more generally, public action frames). Note that this communication may not require association between the root access point and the other access point. Moreover, the other access point may not have an IP address. In particular, the communication technique may use layer-2 (data-link layer) messaging to confirm a manufacturer certificate without this messaging using an IP address.

Then, the other access point may query the registrar device (via the root access point, which has an IP address) for information that can be used to set up the mesh network. For example, the other access point may receive: the location information of the controller from the registrar device, the mesh-network information from the root access point, and/or zone confirmation from the registrar device and/or the controller. Next, the other access point may join the mesh network (or a wireless local area network) using the mesh-network information (such as using Wi-Fi Protected Access II-Pre-Shared Key or WPA2-PSK), may connect with the controller, and then the controller may provision the other access point with the full configuration (at which point, the other access point becomes a mesh-network access point in the mesh network).

Note that mutual trust between the mesh network and the other access point may be established in a secure way. For example, the root access point, the registrar device, and the controller can validate a manufacturer certificate (such as Public Key Infrastructure) to confirm a trust claim. Note that the mesh-network information may include: the mesh-network SSID and a mesh-network PSK passphrase or password (e.g., WPA-PSK, dynamic PSK, IEEE 802.1.x, etc.).

In some embodiments, the other access point receives a zone confirmation. For example, different mesh networks may include different tenants, and a shared controller may manage services in the mesh networks for the different tenants or customers. These services may be distributed based on the zone. Therefore, customer A may be in zone 1 with a configuration in mesh network 1, and customer B may be in zone 2 with a different configuration in mesh network 2.

The communication technique may allow a user, a distributor, an operator, a manufacturer, etc. (which are collectively referred to as a user in the discussion that follows) to pre-provision access-point serial numbers into the registrar device. When the user installs an access point, the access point may use the registrar device to automatically identify and access the associated controller, regardless of where the access point is in the mesh network (such as a root access point, a mesh-network access point, an Ethernet mesh-network access point, etc.).

Note that a serial number of an access point may be manually input or entered into the data structure in the registrar device. Alternatively, the serial number may be entered by scanning a barcode.

Moreover, if an access point is returned because of a hardware failure, a new (replacement) access point may be automatically provisioned to join the mesh network without priming.

In order to enhance security in the communication technique, mutual authentication may be performed. In particular, the mesh network may not allow an access point that has not been pre-provisioned by the controller to join the mesh network. Moreover, the mesh network may not allow an attacker to 'attach' a Trojan-horse access point in order to access a victim mesh network. In some embodiments, the identity of an access point is proven by its manufacturer certificate (using a PKI certificate). Similarly, the access point may not allow a mesh network to successfully phish the access point. Furthermore, the access point may not allow itself to be usurped from its intended purpose/deployment (as defined by the owner of the access point). The registrar device may be the arbiter of access-point ownership (at least for those access points having a cloud-based controller). Note that the identity of the registrar device may be proven by its web certificate. In addition, the identity of the controller may be proven by its web certificate (which may be obtained by an access point during HyperText Transport Protocol Secure-based discovery).

Moreover, in order to provision and auto-form a mesh network, an access point may boot-up from a factory reset condition with mesh-networking enabled. Moreover, when an access point is added to the data structure in the registrar device, the data structure may include: the serial number of the access point, the fully qualified domain name of the serving or associated controller, and information for mutual authentication (such as the public encryption key from its web certificate). Note that the web certificate may provide a stronger form of controller identity than relying on a fully qualified domain-name name resolution without Domain Name System Security Extensions (DNSSEC). This may be needed because the mesh-network access point, prior to authenticating the root access point/network/controller, does not know whether the network it is attempting to connect with is legitimate or a honeypot (i.e., a mesh network set up by an attacker to lure other devices). In a honeypot network, an attacker could fake DNS replies in order to direct the mesh-network access point to connect with a fake controller (e.g., to continue the attack). Such an attack would not be feasible in a network employing DNSSEC because the mesh-network access point would detect that the DNS reply had been tampered/modified.

When a controller uses a self-signed certificate, provisioning the public encryption key from the registrar device may ensure that an access point connects to the intended controller (and, thus, is not spoofed).

Note that the communication technique may employ a proxy query to the registrar device, for which an access point may need to rely on another access point to provide it with valid identities. When the identity of the registrar (as included in its web certificate) has been certified by a certificate authority (CA) and its reply is signed using its private key, it is infeasible for the network relaying the reply from the registrar to tamper with or modify that reply. Thus, the reply, in this case, is trustworthy. Therefore, stronger identity types may be preferred.

Figure 4:
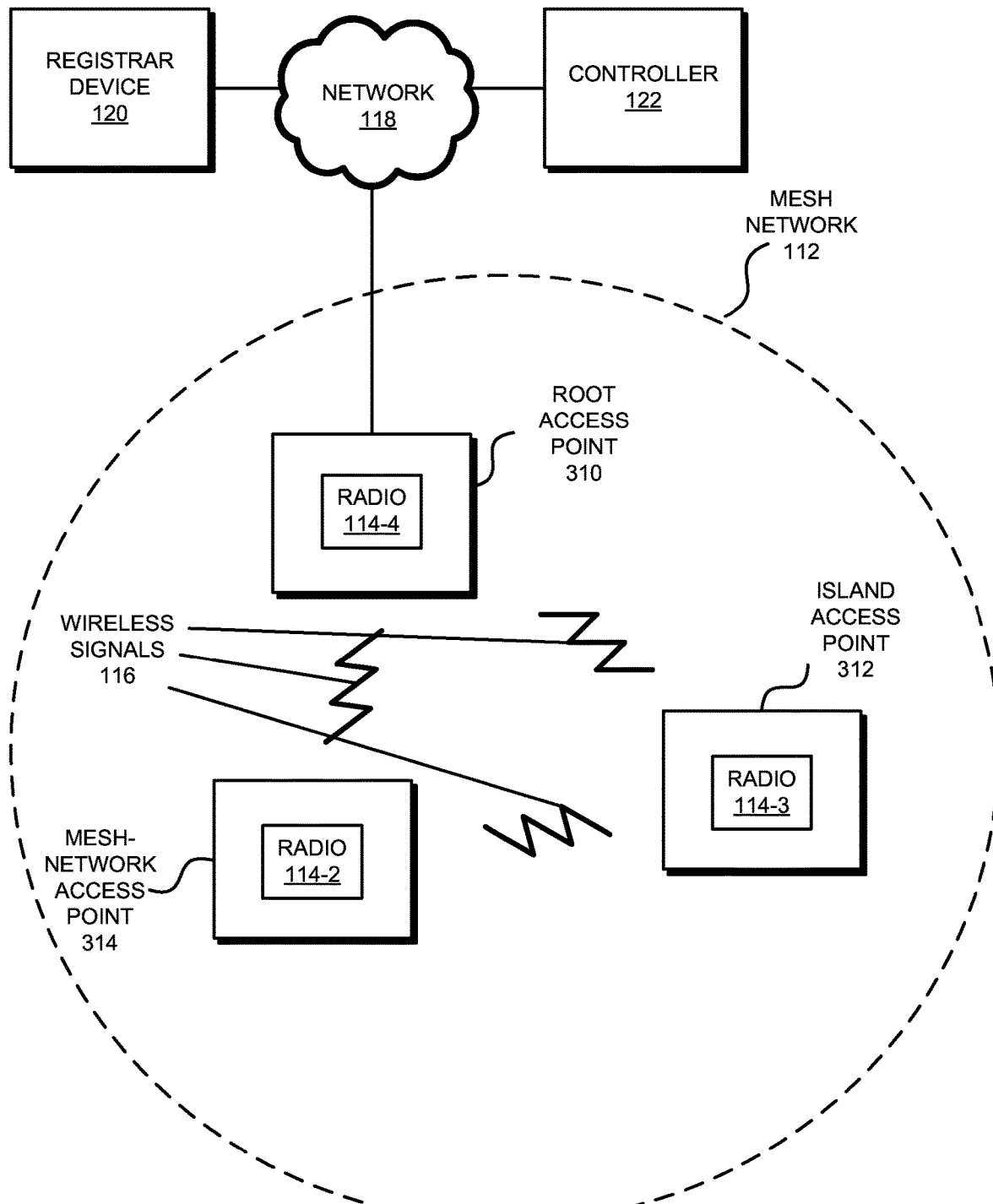
FIG. 4 is a block diagram illustrating access points communicating in accordance with an embodiment of the present disclosure.

As shown in FIG. 4, in an exemplary embodiment, an island access point 312 in factory reset condition performs network discovery (e.g., scans) to find other access points (e.g., as advertised by information elements included in IEEE 802.11 beacon frames) in a mesh network 112, such as root access point 310 (or, in other embodiments, mesh-network access point 314, which may also be used by island access point 312 to communicate with registrar device 120 and/or controller 122). In some embodiments, this capability is only supported in mesh-network-enabled access points from the same manufacturer that support a proprietary message exchange (thus, attempting an exchange with an access point that does not meet these conditions will fail). In particular, a new bit may be defined in an information element transmitted in beacon frames that specifies whether access-point-proxy registrar-device-query is enabled or disabled (an access point may only continue the exchange if enabled). Thus, an access point that is not mesh-network enabled or is mesh-network enabled but has been informed by its associated controller 122 that no more mesh-network access points may join mesh network 112 or that there are no missing mesh-network access points (i.e., access points that are provisioned but disconnected from mesh network 112), may disable proxy-registrar-device queries (thus, new access points that want to join mesh network 112 may need to have a wired connection to controller 122 in order to do so). Access point 312 may request the manufacturer certificate that includes the public encryption key (in a public-encryption-key/private-encryption-key pair) from root access point 310 using an IEEE 802.11u generic advertising service. Moreover, access point 312 may generate a nonce (such as a random or pseudorandom number) for later user by registrar device 120, and then may optionally encrypt the nonce and its own manufacturer certificate with the public encryption key of root access point 310. The resulting data structure may be sent to root access point 310 using the IEEE 802.11u generic advertising service. (However, the encryption operation may be skipped if there is not concern about exposing the nonce and the manufacturer certificate to potential eavesdroppers).

Upon receiving the manufacturer certificate from root access point 312, island access point 310 can validate this manufacturer certificate. If it is valid and if the identity of root access point 312 is acceptable (e.g., root access point 310 is manufactured by the same company that manufactured island access point 310), island access point 310 can continue the discovery exchange. If it is not acceptable, island access point 310 may abort the exchange and search for another mesh network to join.

The encryption operation, when employed, accomplishes two objectives. The first is that it prevents exposure of the identity of island access point 312 to potential eavesdroppers. The second is that root access point 310 may need to possess the private key (of the private/public encryption-key-pair), otherwise it may not be able to decrypt the data structure. One reason root access point 310 may not have the private key is if it is a honeypot root access point employed by an attacker. Generally it is much more difficult for an attacker to obtain the private key than to obtain the manufacturer certificate. Therefore, by encrypting with the public key of root access point 310, island access point 312 can mitigate some honeypot attacks.

Root access point 310 may decrypt the data structure with its private encryption key and may validate the manufacturer certificate of the access point. For example, the validation may confirm that the manufacturer certificate is signed by the manufacturer certificate authority, hashes correctly (i.e., has not been tampered with) and has not expired. If the manufacturer certificate validates properly, root access point 310 may proxy a controller discovery request to registrar device 120. However, if validation fails, root access point 310 may quit helping island access point 312.

After receiving the proxy controller discovery request, registrar device 120 may generate a nonce and concatenate the nonce from island access point 312. Then, registrar device 120 may: combine the fully qualified domain name and the public encryption key of controller 122 with the concatenated nonce, digitally sign with its private encryption key, add its web certificate, and send the resulting data structure back to root access point 310. Note that signing the concatenated nonce may mitigate man-in-the-middle (MITM) replay attacks.

Root access point 310 may check the fully qualified domain name and the public encryption key of controller 122 for a match with the ones it used. If there is a match, root access point 310 may complete the authorization by determining if island access point 312 is configured to be in the same zone. For example, root access point 310 may query controller 122 to see if island access point 312 is provisioned in the same zone. Alternatively, if registrar device 120 is configured with the zone name of island access point 312, then it may return that in its response and root access point 310 may check for a match. If the preceding operations succeed, island access point 312 may be authorized to join mesh network 112 of root access point 310.

Then, root access point 310 may add the mesh-network SSID and the mesh-network PSK passphrase (a.k.a., WPA-Personal) to the information sent by registrar device 120. More generally, the security information may implement a wide variety of security or encryption techniques, such as: WPA2-Enterprise (with a username and a password), an embedded universal integrated circuit card or eSIM, etc. Consequently, the security information may include an identity or identifier for a given electronic device and/or a passphrase or password. Moreover, root access point 310 may encrypt the data structure with the public encryption key of island access point 312 and may send the data structure to island access point 310. Note that root access point 310 may obtain the public encryption key of island access point 312 from the manufacturer certificate of island access point 312.

Next, island access point 312 may decrypt the data structure with its private encryption key, so that it has the mesh-network SSID and the mesh-network PSK passphrase. Note that, if island access point 312 does not possess the private encryption key, then it cannot feasibly decrypt the data structure (i.e., decryption would take a very long time, such as 100 years) and the mesh-network PSK passphrase will remain opaque and safe (this is because an attacker access point will not possess the private encryption key).

This encryption operation may serve to complete the mutual authentication process between island access point 310 and controller 122, thereby ensuring that the identity of island access point 312 is authentic and that island access point 312 is authorized to join mesh network 112. Without this encryption operation, it would be much easier for an attacker's island access point to join mesh network 112, thereby violating the integrity and security of mesh network 112, as well as potentially providing the attacker access to network resources (e.g., servers) they are not entitled to access.

Island access point 312 may use WPA2-PSK to join mesh network 112. Furthermore, island access point 312 may discover controller 122. During discovery (using HyperText Transfer Protocol Secure or HTTPS), island access point 312 may get the public encryption key of controller 122 (from its web certificate). If the public encryption key matches the one provided by registrar device 120, then island access point 312 remains associated. If not, island access point 312 may disassociate from mesh network 112 and may continue the mesh-network discovery process. Note that when island access point 312 joins mesh network 112, it may become another mesh-network access point (like mesh-network access point 314).

We now describe embodiments of the electronic device. FIG. 5 presents a block diagram illustrating an electronic device 500, such as one of electronic devices 110 in FIG. 1 (e.g., electronic device 110-1). This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520. (While FIG. 5 includes one or more antennas 520, in some embodiments electronic device 500 includes one or more nodes, such as one or more nodes 508, e.g., a pad, which can be coupled to one or more antennas 520. Thus, electronic device 500 may or may not include one or more antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5.

Figure 5:
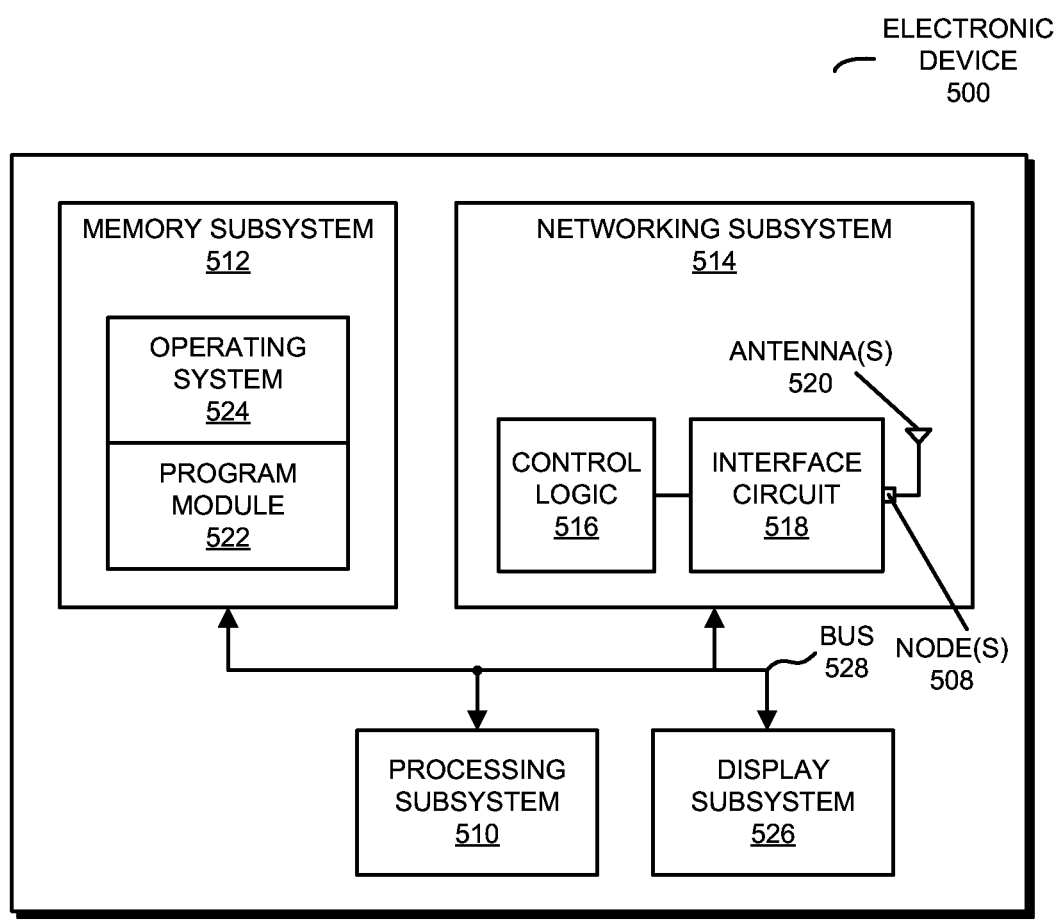
FIG. 5 is a block diagram illustrating one of the electronic devices of FIG. 1 in accordance with an embodiment of the present disclosure.

Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) and/or in firmware in interface circuit 518. Alternatively or additionally, at least some of the operations in the communication technique may be implemented in a physical layer, such as hardware in interface circuit 518.

Moreover, while a mesh network was used as an illustration in the preceding embodiments, in other embodiments the communication technique is used to establish connectivity in a wide variety of communication environments and architectures. For example, the communication technique may be used to establish connectivity among electronic devices in the Internet of Things. Thus, the communication technique may be used to facilitate connectivity among electronic devices without priming or pre-provisioning of the security information.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to couple to an antenna;
an interface circuit, coupled to the node, configured to communicate with another electronic device, wherein the electronic device is configured to onboard to a mesh network by performing operations comprising:
discovering, via the interface circuit and using wireless communication, the other electronic device, wherein the discovering comprises a wireless scan, and wherein the other electronic device is included in the mesh network;
providing, from the interface circuit, a request for location information of a controller for the electronic device, wherein the request is intended for a registrar device, external to the mesh network, at a predefined location in a network and comprises a manufacturer certificate that confirms an identity of the electronic device, and wherein communication associated with the registrar device is further associated with the other electronic device as an intermediary and uses the wireless communication without an authenticated session between the electronic device and the other electronic device;
receiving, at the interface circuit, the location information and a registrar certificate that confirms an identity of the registrar device, wherein the location information and the registrar certificate are associated with the registrar device;
validating the registrar certificate;
receiving, at the interface circuit, mesh-network information for the mesh network that comprises the other electronic device, wherein the mesh-network information is associated with the other electronic device and comprises a mesh-network SSID and a mesh-network password;
joining, via the interface circuit, the mesh network using the mesh-network information;
providing, from the interface circuit, another request for security information to establish connectivity with the other electronic device, wherein the other request is intended for the controller and the other electronic device as an intermediary, and wherein the electronic device does not have the security information prior to requesting the security information;
receiving, at the interface circuit, the security information and a controller certificate that confirms an identity of the controller, wherein the security information and the controller certificate are associated with the controller and the other electronic device as an intermediary; and
validating the controller certificate.

2. The electronic device of claim 1, wherein the operations comprise establishing, via the interface circuit, a connection with the other electronic device based on the security information.

3. The electronic device of claim 1, wherein the electronic device comprises a headless electronic device without a user interface.

4. The electronic device of claim 1, wherein the operations comprise providing the request for the location information a first time that the electronic device is connected to the network.

5. The electronic device of claim 1, wherein the security information comprises additional provisioning information for the mesh network.

6. The electronic device of claim 5,
wherein the operations comprise establishing, via the interface circuit, the mesh network with a third electronic device by:
broadcasting the mesh-network SSID;
receiving, from the interface circuit, the manufacturer certificate associated with the other electronic device and the third electronic device;
validating the manufacturer certificate; and
providing, from the interface circuit, the provisioning information intended for the third electronic device.

7. The electronic device of claim 1, wherein the security information facilitates secure communication with the other electronic device.

8. The electronic device of claim 1, wherein the wireless communication is compatible with IEEE 802.11 public action frames.

9. The electronic device of claim 1, wherein the other electronic device comprises an access point.

10. The electronic device of claim 1, wherein, after discovering the other electronic device, the operations comprise:
requesting, via the interface circuit, an encryption key and a manufacturer certificate of the other electronic device; and
validating the manufacturer certificate of the other electronic device; and
wherein subsequent wireless communication via the interface circuit and intended for the other electronic device is encrypted using the encryption key of the other electronic device.

11. The electronic device of claim 1, wherein, after discovering the other electronic device, the operations comprise providing an encryption key of the electronic device intended for the other electronic device; and
wherein subsequent wireless communication via the interface circuit and for the electronic device is encrypted using the encryption key of the electronic device.

12. The electronic device of claim 1, wherein the electronic device further comprises:

a processor; and
a memory, coupled to the processor, which stores program instructions, wherein, when executed by the processor, the program instructions cause the electronic device to perform at least one of: the discovering, the providing the request, the receiving of the location information and the registrar certificate, the validating of the registrar certificate, the providing the other request, the receiving of the security information and the controller certificate, or the validating of the controller certificate.

13. A non-transitory computer-readable storage medium for use in conjunction with an electronic device, the computer-readable storage medium storing program instructions, wherein, when executed by the electronic device, the program instructions cause the electronic device to receive security information while onboarding to a mesh network by performing one or more operations, comprising:
discovering, via an interface circuit in the electronic device and using wireless communication, another electronic device, wherein the discovering comprises a wireless scan;
providing, from the interface circuit, a request for location information of a controller for the electronic device, wherein the request is intended for a registrar device, external to the mesh network, at a predefined location in a network and comprises a manufacturer certificate that confirms an identity of the electronic device, and wherein communication associated with the registrar device is further associated with the other electronic device as an intermediary and uses the wireless communication without an authenticated session between the electronic device and the other electronic device;
receiving, at the interface circuit, the location information and a registrar certificate that confirms an identity of the registrar device, wherein the location information and the registrar certificate are associated with the registrar device;
validating the registrar certificate;
receiving, at the interface circuit, mesh-network information for the mesh network that comprises the other electronic device, wherein the mesh-network information is associated with the other electronic device and comprises a mesh-network SSID and a mesh-network password;
joining, via the interface circuit, the mesh network using the mesh-network information;
providing, from the interface circuit, another request for the security information to establish connectivity with the other electronic device, wherein the other request is intended for the controller and the other electronic device as an intermediary, and wherein the electronic device does not have the security information prior to requesting the security information;
receiving, at the interface circuit, the security information and a controller certificate that confirms an identity of the controller, wherein the security information and the controller certificate are associated with the controller and the other electronic device as an intermediary; and
validating the controller certificate.

14. The computer-readable storage medium of claim 13, wherein the one or more operations comprise establishing, via the interface circuit, a connection with the other electronic device based on the security information.

15. The computer-readable storage medium of claim 13, wherein the security information comprises additional provisioning information for the mesh network; and wherein the one or more operations comprise establishing, via the interface circuit, the mesh network with a third electronic device by:
broadcasting the mesh-network SSID;
receiving, from the interface circuit, the manufacturer certificate associated with the other electronic device and the third electronic device;
validating the manufacturer certificate; and
providing, from the interface circuit, the provisioning information intended for the third electronic device.

16. A method for receiving security information while onboarding to a mesh network, comprising:
by an electronic device:
discovering, via an interface circuit in the electronic device and using wireless communication, another electronic device, wherein the discovering comprises a wireless scan;
providing, from the interface circuit, a request for location information of a controller for the electronic device, wherein the request is intended for a registrar device, external to the mesh network, at a predefined location in a network and comprises a manufacturer certificate that confirms an identity of the electronic device, and wherein communication associated with the registrar device is further associated with the other electronic device as an intermediary and uses the wireless communication without an authenticated session between the electronic device and the other electronic device;
receiving, at the interface circuit, the location information and a registrar certificate that confirms an identity of the registrar device, wherein the location information and the registrar certificate are associated with the registrar device;
validating the registrar certificate;
receiving, at the interface circuit, mesh-network information for the mesh network that comprises the other electronic device, wherein the mesh-network information is associated with the other electronic device and comprises a mesh-network SSID and a mesh-network password;
joining, via the interface circuit, the mesh network using the mesh-network information;
providing, from the interface circuit, another request for the security information to establish connectivity with the other electronic device, wherein the other request is intended for the controller and the other electronic device as an intermediary, and wherein the electronic device does not have the security information prior to requesting the security information;
receiving, at the interface circuit, the security information and a controller certificate that confirms an identity of the controller, wherein the security information and the controller certificate are associated with the controller and the other electronic device as an intermediary; and
validating the controller certificate.

17. The method of claim 16, wherein the security information comprises additional provisioning information for the mesh network; and
wherein the method comprises establishing, via the interface circuit, the mesh network with a third electronic device by:
broadcasting the mesh-network SSID;
receiving, from the interface circuit, the manufacturer certificate associated with the other electronic device and the third electronic device;
validating the manufacturer certificate; and
providing, from the interface circuit, the provisioning information intended for the third electronic device.

18. The method of claim 16, wherein the method comprises establishing, via the interface circuit, a connection with the other electronic device based on the security information.

19. The method of claim 16, wherein the electronic device comprises a headless electronic device without a user interface.

20. The computer-readable storage medium of claim 13, wherein the electronic device comprises a headless electronic device without a user interface.

* * * * *